United States Patent Office 3,490,464
Patented Jan. 20, 1970

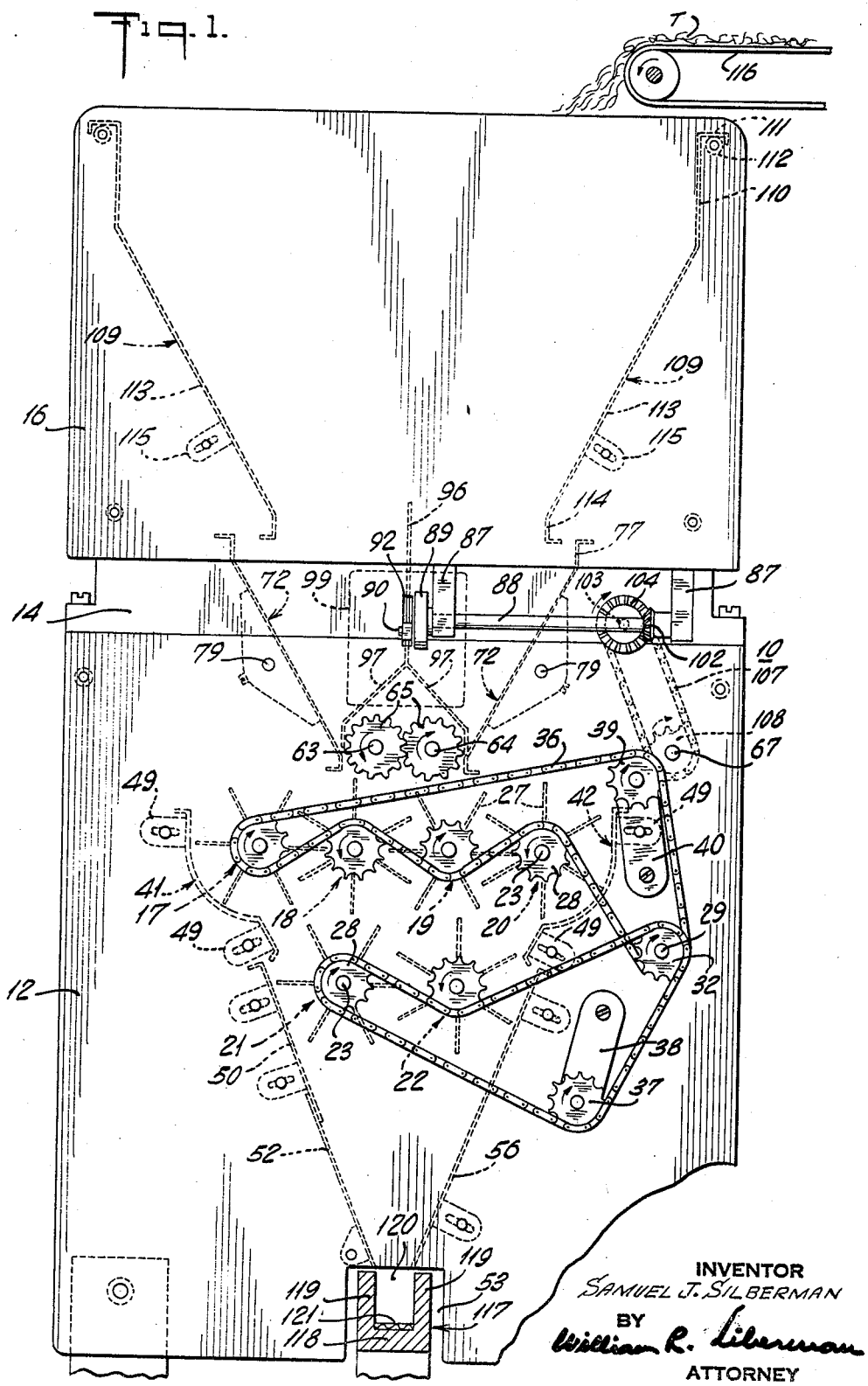

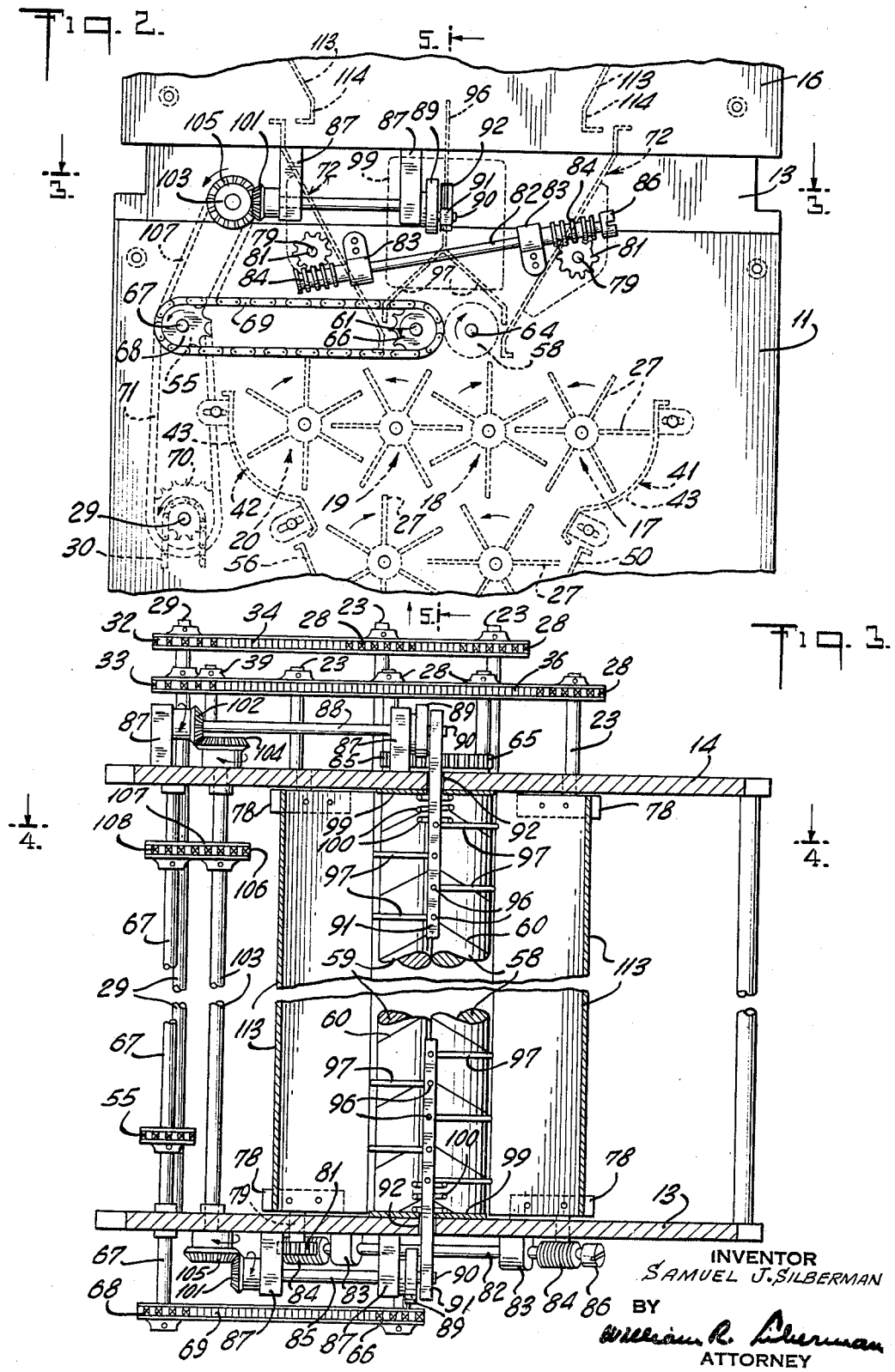

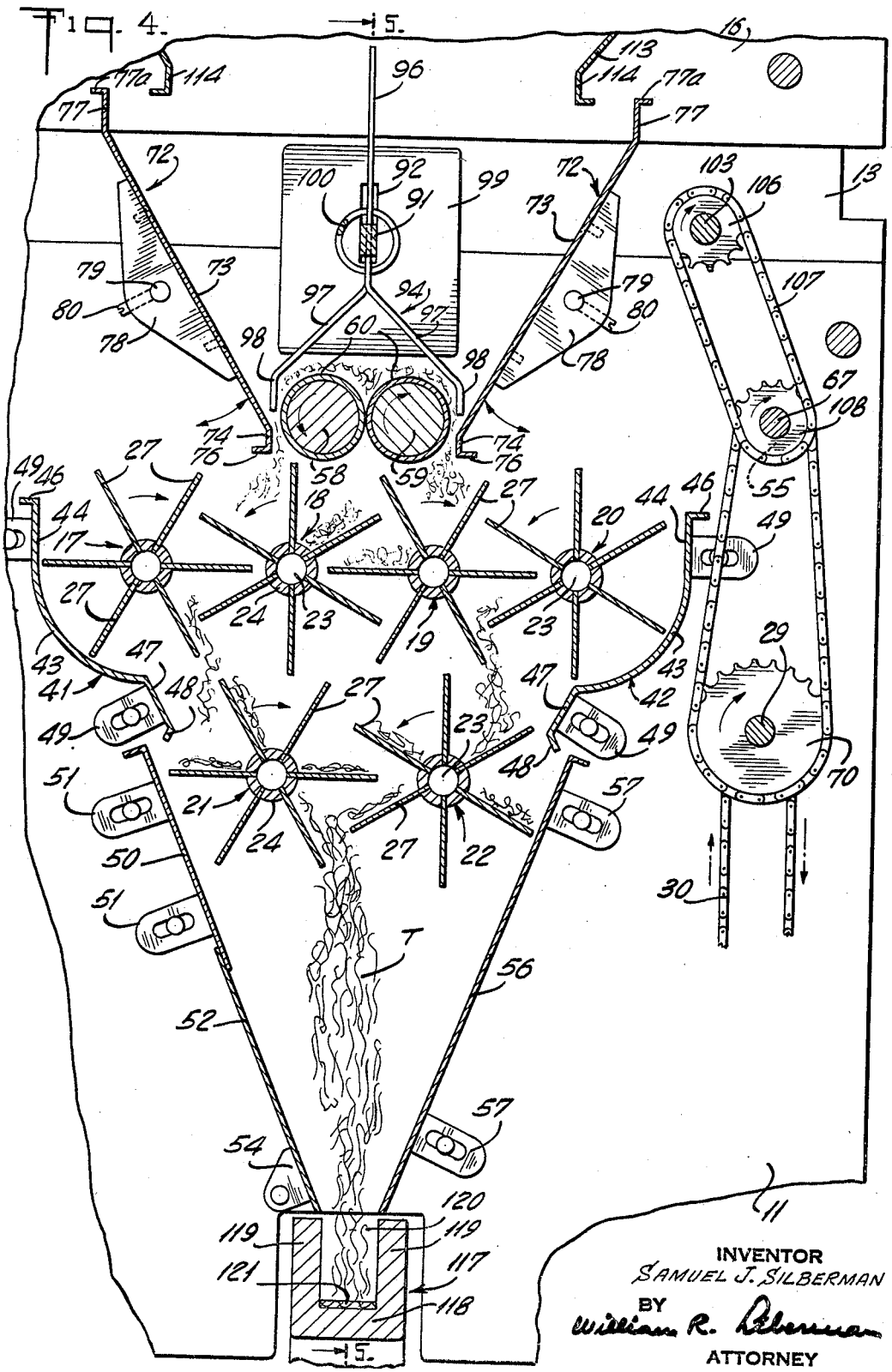

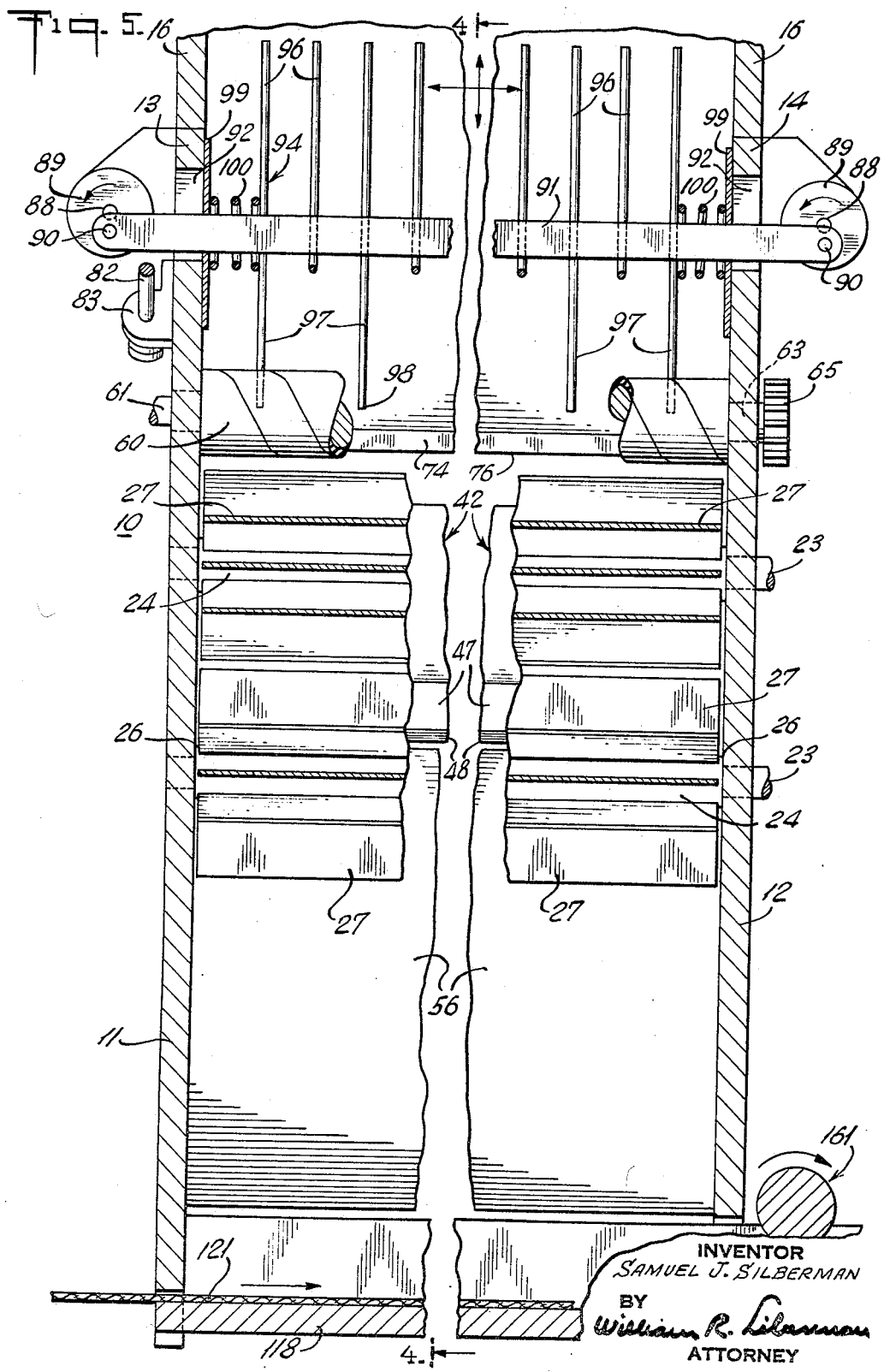

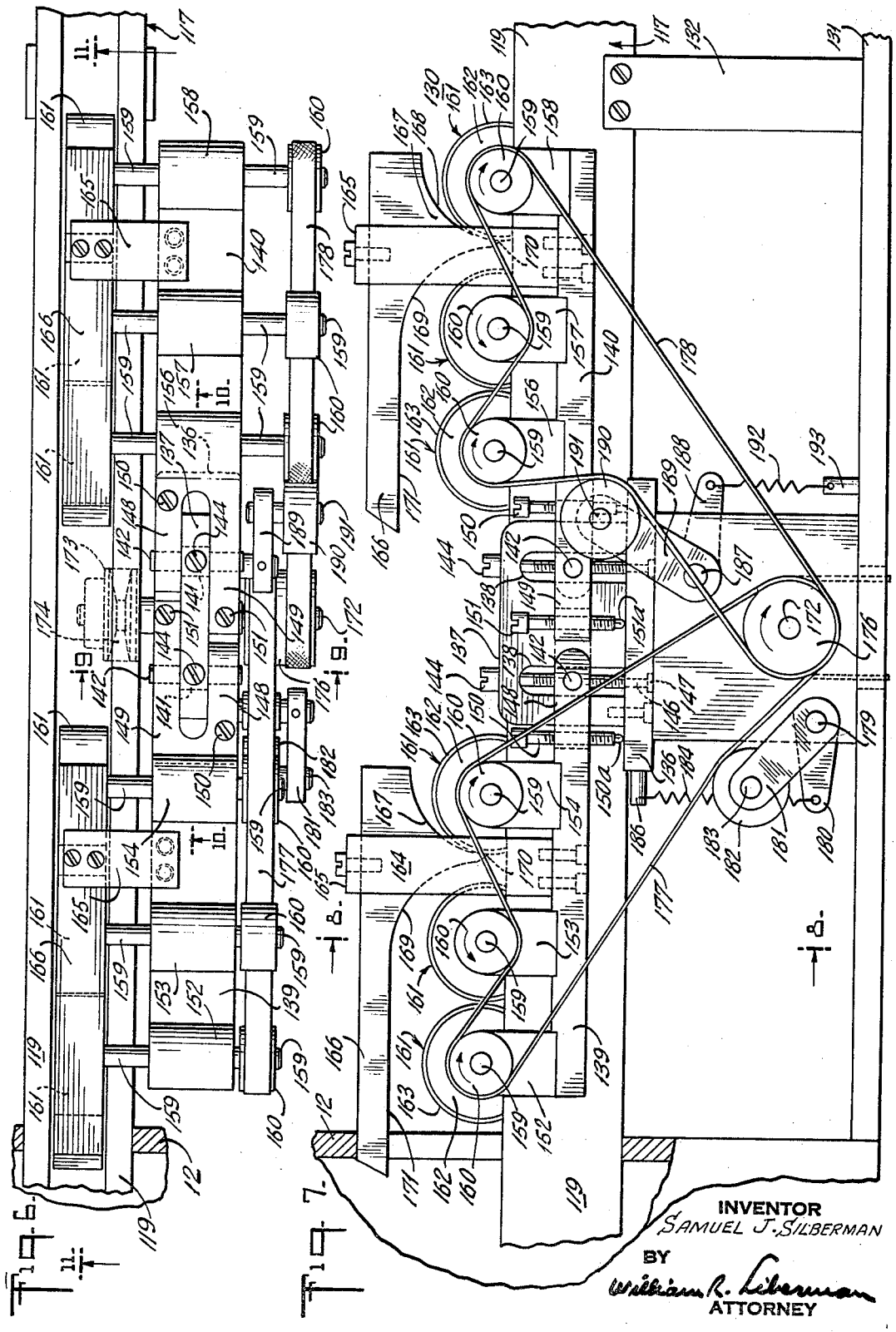

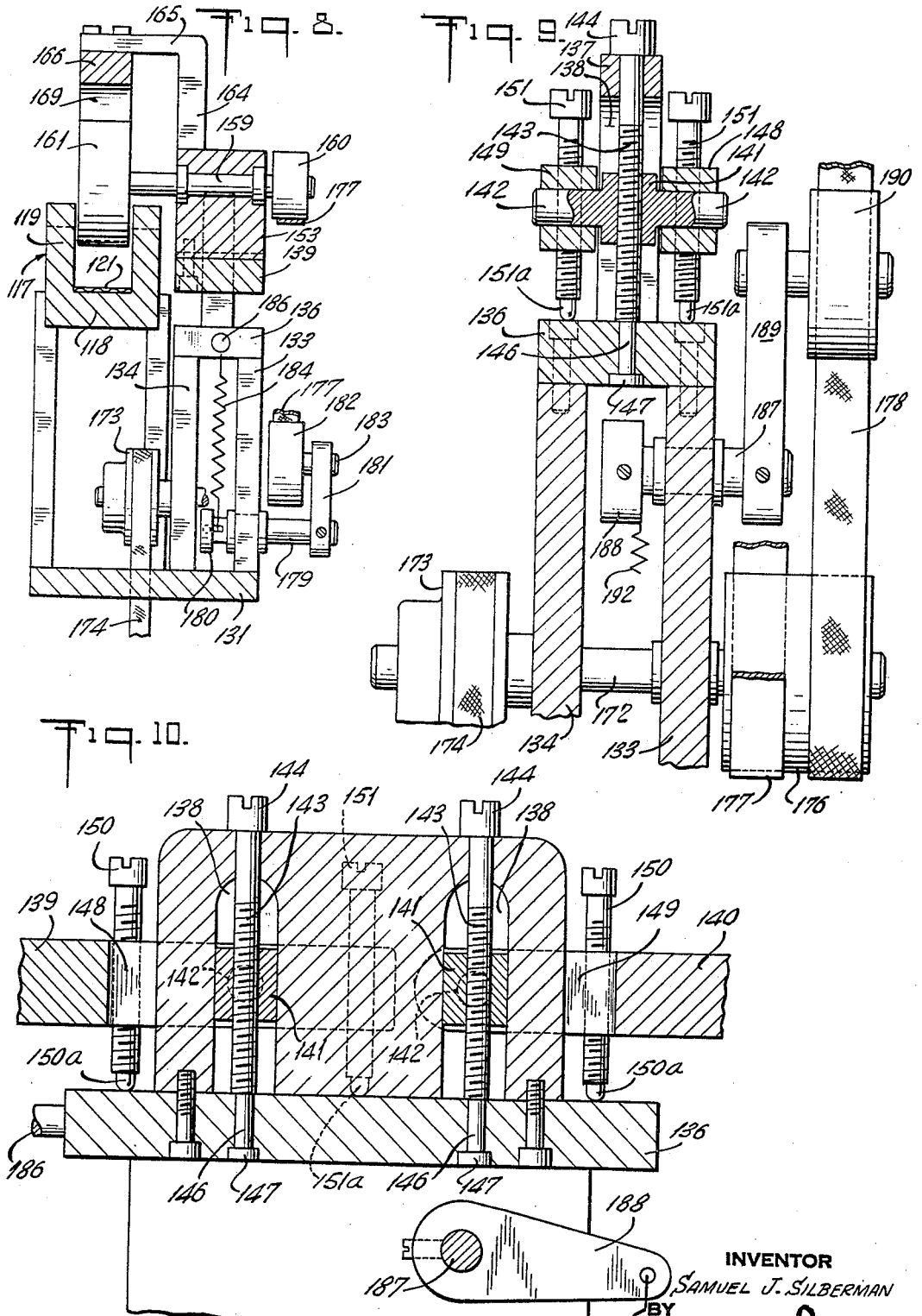

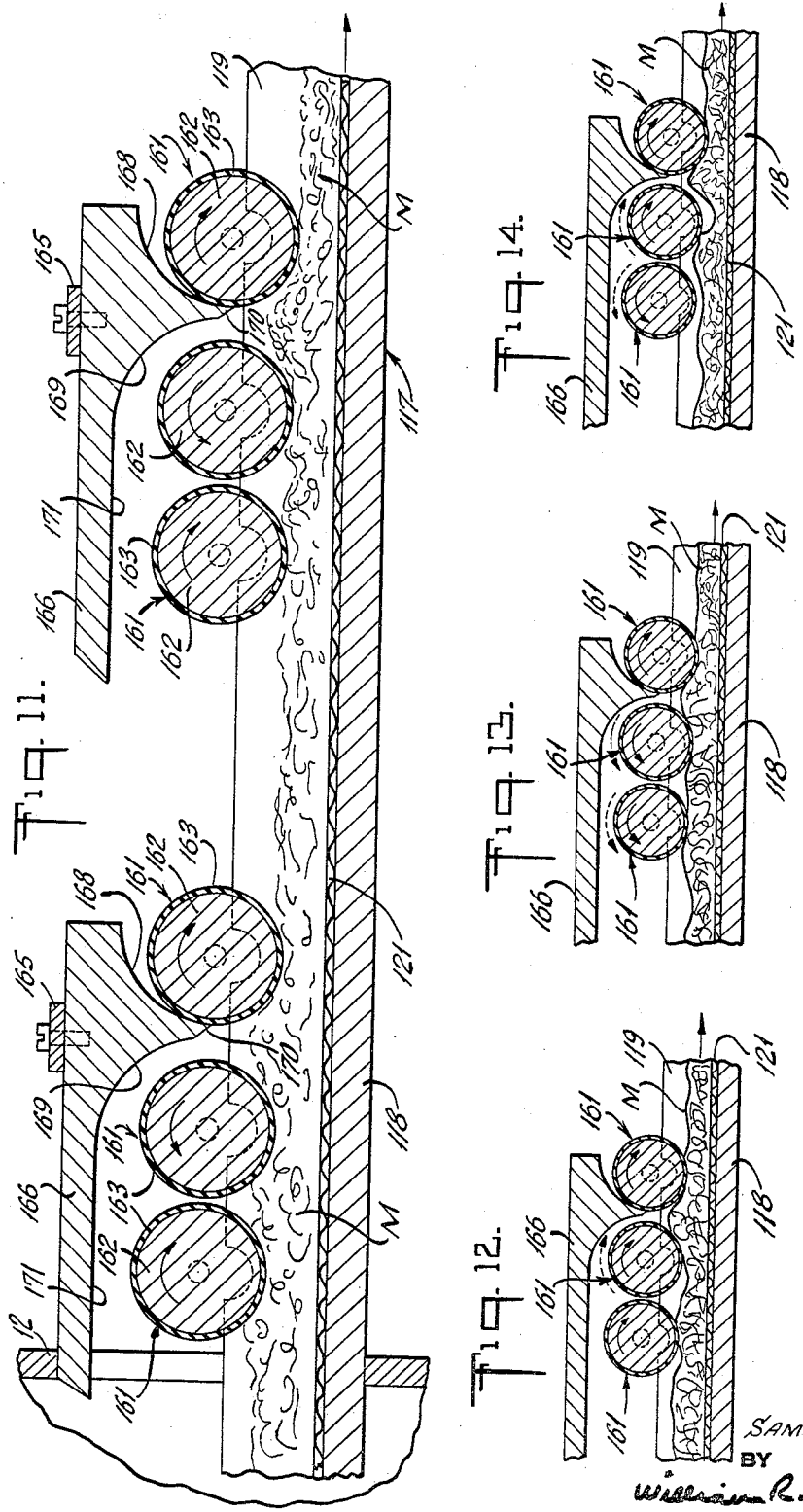

3,490,464
APPARATUS FOR DISTRIBUTING AND REGULATING THE FLOW OF PARTICULATE MATERIAL
Samuel J. Silberman, 885 Park Ave.,
New York, N.Y. 10021
Filed Jan. 26, 1966, Ser. No. 523,063
Int. Cl. A24c 5/18; A24b 3/06
U.S. Cl. 131—84
14 Claims

ABSTRACT OF THE DISCLOSURE

A filler tobacco feed apparatus includes a trough along which a conveyor band is advanced and a feed hopper is positioned above the trailing end of the band and includes a lower pair of rotating interdigitating paddle wheels and an upper group of rotating successive interdigitating paddle wheels the medial pair of which is aligned with the lower pair and rotates so that the confronting sections of the medial pair advance upwardly. A pair of contiguous rolls register with a second hopper discharge opening located above the medial upper pair of paddle wheels and are rotated so that the roll surfaces at the bite thereof advance upwardly, and reciprocating combs are positioned along the outer faces of the rolls. Two sets of rough surfaced levelling rolls register with the trough, forward of the feed hopper, and are of successively lower levels and are driven at high speeds relative to the conveyor belt with the leading roll of each set rotating with its lower face moving in a direction opposite that of the conveyor belt. A guide member extends from the rear edge of each leading regulator roll upwardly and rearwardly above the respective trailing rolls.

---

The present invention relates generally to improvements in solids feeding apparatus and it relates particularly to an improved apparatus for the feeding, distribution and feed regulation of a shred-type material such as tobacco and the like.

Many devices involve the handling and feeding of a non-uniform particulate material of a shred like nature. In the production of tobacco products such as cigars and cigarettes, and particularly in the continuous production of cigars in the manners disclosed in U.S. Patent No. 3,152,595 granted Oct. 13, 1964, to Samuel J. Silberman and in copending patent applications Ser. No. 348,951 filed Mar. 3, 1964, now Patent No. 3,238,951, issued Mar. 8, 1966, and Ser. No. 505,342 filed Oct. 27, 1965, now Patent No. 3,398,751, issued Aug. 27, 1968, in the name of Samuel J. Silberman, it is necessary to feed the tobacco filler shreds or particles to the cigar forming equipment at a uniform rate and in a properly distributed state. The apparatus heretofore available and proposed for feeding tobacco to a cigarette or cigar forming machine possesses many drawbacks and disadvantages. They are large, complex, bulky and expensive machines of relatively small capacity and large power and space requirements. In addition they are of little versatility and adaptability, do not generally effect an optimum tobacco distribution and uniform feed rate and otherwise leave much to be desired.

It is, therefore, a principal object of the present invention to provide an improved material handling and feeding apparatus.

Another object of the present invention is to provide an improved apparatus for the handling, distribution and uniform feeding of material of a shred like nature.

Still another object of the present invention is to provide an improved apparatus for the distribution and feeding of tobacco to cigar and cigarette forming machines.

A further object of the present invention is to provide a machine for depositing tobacco onto a conveyor belt in an optimum distribution and orientation state and to feed the tobacco at a closely regulated uniform rate to a cigar or cigarette forming machine.

The above and other objects of the present invention will become apparent from a reading of the following description taken in conjunction with the accompanying drawings, wherein:

FIGURE 1 is an elevational view of the trailing end of an apparatus embodying the present invention;
FIGURE 2 is a fragmentary elevational view of the leading end thereof;
FIGURE 3 is a sectional view taken along line 3—3 of FIGURE 2;
FIGURE 4 is a sectional view taken along line 4—4 of FIGURE 3;
FIGURE 5 is a vertical fragmentary sectional view taken along lines 5—5 of FIGURES 2 and 4;
FIGURE 6 is a top plan fragmentary view of the leading or regulator section of the apparatus;
FIGURE 7 is a front elevational view thereof;
FIGURE 8 is a sectional view taken along line 8—8 of FIGURE 7;
FIGURE 9 is an enlarged sectional view taken along line 9—9 of FIGURE 6;
FIGURE 10 is an enlarged sectional fragmentary view taken along line 10—10 of FIGURE 6;
FIGURE 11 is an enlarged sectional view taken along line 11—11 of FIGURE 6; and
FIGURES 12 through 14 are fragmentary sectional views similar to FIGURE 11 of different operational embodiments of the present invention.

Referring now to the drawings which illustrate a preferred embodiment of the present invention and particularly FIGURES 1 to 5 thereof which illustrate the tobacco feed and distributing section, reference numeral 10 (FIG. 5) generally designates the feed and distributing section which includes a pair of longitudinally spaced, parallel, vertical, transversely extending trailing and leading end mounting plates 11 and 12, respectively. Plates 11 and 12 are of rectangular configuration and suitably supported. Resting on and secured to the upper edges of the plates 11 and 12 are intermediate bars 13 and 14 respectively upon which are mounted vertical upper rectangular plates 16, 16 which are substantially coplanar with corresponding bottom plates 11 and 12.

The tobacco feed and distributing paddles include an upper set of four paddle wheels 17, 18, 19 and 20, respectively, and a lower set of two paddle wheels 21, and 22 positioned below the upper set of paddle wheels. Paddle wheels 17–22 are parallel and extend transversely between plates 11 and 12, each paddle wheel including a shaft 23 supported by and journalled between plates 11 and 12 and projecting beyond plate 12. A cylindrical hub 24 is axially positioned on and secured to each shaft 23 and is spaced from the adjacent inner faces of plates 11 and 12 by peripheral end flanges 26. Regularly circumferentially spaced around each hub 24 and extending for the full length thereof between end flanges 26 are radially projecting fins or paddles 27 and while each paddle wheel advantageously contains six paddles 27 spaced 60° apart it may contain a greater or lesser number, each paddle wheel containing, however, the same number of paddles 27.

Shafts 23 of the upper set of paddles 17 to 20 are at the same level and equally transversely spaced from each other. The width of fins or paddles 27 is somewhat less than the distance between the adjacent faces of a successive pair of hubs 24 and greater than one half this distance so that the paddle wheels may be rotated with paddles 27 of successive or adjacent paddle wheels circumferentially interdigitating, that is, the paddles of a paddle wheel project between the circumferentially-spaced confronting panels of the adjacent paddle wheel.

Paddle wheels 21 and 22 of the lower set thereof are of substantially the same configuration and construction as the upper paddle wheels, shafts 23 thereof being disposed below and midway between the upper shafts of the intermediate pair of paddle wheels 18 and 19 and the space between the lower shafts 23 being slightly greater than the space between the upper set of shafts 23. The vertical center-to-center distance between upper and lower shafts 23 is approximately equal to twice the distance between the edges of paddles 27 and the center of the corresponding supporting shaft 23. Upper paddle wheels 17, 18, 19, 20, are so relatively phased in the manner hereinafter described and as shown in the drawings, that successive paddle wheels are in circumferentially interdigitating relationship. The lower paddle wheels 21 and 22 are similarly phased relative to each other and to the upper paddle wheels 18 and 19, respectively.

Affixed to the outer end of each shaft 23 and beyond the outer face of plate 12 are similar sprocket wheels 28 (FIG. 3), the sprocket wheels 28 on the upper shafts 23 being vertically coplanar and axially offset relative to the sprocket wheels 28 on the lower shafts 23 which are likewise vertically coplanar. A main drive shaft 29 transversely spaced from and at a level between the upper and lower sets of shafts 23 is journalled between plates 11 and 12 and projects rearwardly beyond plate 12. Drive shaft 29 is coupled by a sprocket chain 30 and associated sprocket wheels to a suitably mounted variable speed electric drive motor.

Also affixed to the free end of shaft 29 extending beyond plate 12 are a pair of similar sprocket wheels 32 and 33 respectively, sprocket wheel 32 being coplanar with sprocket wheels 28 on the lower set of shafts 23 and sprocket wheel 33 being coplanar with sprocket wheels 28 on the upper set of shafts 23. A sprocket chain 34 couples upper sprocket wheel 32 and lower sprocket wheels 28, extending over sprocket wheel 28 of paddle wheel 21 and under sprocket wheel 28 of paddle wheel 22. Shaft 29 rotates clockwise as viewed in FIGURE 1 thereby to rotate paddle wheels 21 and 22 clockwise and counterclockwise respectively. A sprocket chain 36 couples sprocket wheel 33 and sprocket wheels 28 on upper shafts 23, extending over and under successive sprocket wheels 28 thereby to rotate successive sprocket wheels in opposite directions with paddle wheels 17 and 19 rotating clockwise and paddle wheels 18 and 20 rotating counterclockwise, as viewed in FIGURE 1, with drive shaft 29 rotating clockwise. Chain 34 is maintained under tension by an idler sprocket wheel 37 engaging chain 34 and rotatably supported at the free end of a swingable arm 38 pivotally mounted at its upper end to plate 12. Chain 36 is similarly maintained under tension by an idler sprocket wheel 39 engaging chain 36 and rotatably supported at the free end of a swing arm 40 mounted at its lower end to plate 12. Suitable springs may be employed to bias said arms so that the sprocket wheels 37 and 39 maintain the chains 34 and 36 under the tension described.

Chains 34 and 36 and sprocket wheels 28 are so related so that the paddle wheels 17, 18, 19, 20, 21 and 22 are angularly related in the manner above set forth. Thus, the pair of paddle wheels 18 and 19 cooperate and rotate to carry or reject material therebetween upwardly whereas each of the pairs of adjacent paddle wheels 17 and 18, and 19 and 20 cooperate and rotate to advance or feed material therebetween downwardly. Paddle wheels 21 and 22 cooperate and rotate to feed and advance material therebetween downwardly. Material in the peripheral sections of the paddle wheels 17, 20, 21 and 22 are rejected or carried upwardly.

An adjustable hopper-shaped arrangement confines the passage of tobacco to the area of the paddle wheels and includes a pair of opposite upper guide plates 41 and 42 disposed adjacent and along the full length of paddle wheels 17 and 20 respectively (FIG. 4). Each guide plate 41, 42 includes an arcuate cylindrical section 43 extending along the lower outer periphery of each of the respective paddle wheels 17, 20 and connected at its top to a vertical plane 44 terminating in an outwardly directed flange 46 and at its bottom to an inwardly downwardly inclined panel 47 terminating in an outwardly downwardly directed flange 48. Pairs of upper and lower slotted ears 49 project outwardly from opposite ends of panels 44 and 47 and abut the inner faces of plates 11 and 12 and are adjustably secured thereto by screws which engage longitudinal slots formed in said ears 49.

A downwardly inwardly inclined panel 50 is disposed directly below the lower edge of bottom flange 48 of guide plate 41 and is provided with upper and lower rearwardly directed slotted ears 51 along its end edges which abut the inner faces of end plates 11 and 12 and are adjustably secured thereto. Substantially coplanar with panel 50 is a panel 52 which extends from the lower rear border of panel 50 toward the upper edges of longitudinally aligned medially located rectangular openings 53 formed in the bottom edges of plates 11 and 12. A pair of ears 54 project from the lower outer edges of the panel 52 and are secured to plates 11 and 12. Extending downwardly and inwardly from outside the bottom edge of guide plate 42 to the upper edge of openings 53 is an inclined panel 56, provided with upper and lower slotted ears 57 along its edges abutting and secured to plates 11 and 12. The bottom edges of the panels 52 and 56 are symmetrically disposed relative to openings 53 and are mutually spaced a distance less than the width of the openings 53.

A pair of longitudinal substantially abutting parallel horizontal rollers 58 and 59 are medially disposed directly above the intermediate pair of paddle wheels 18, 19 and extend substantially the full distance between the confronting faces of plates 11 and 12. Each of rollers 58, 59 is provided with a rough, peripheral surface which is defined by sand paper sleeves 60 tightly engaging rollers 58 and 59 for their full lengths and being rotatable therewith. Sleeves 60 have an outer grit surface of between 10 and 80 grit, preferable about 30 grit. Axially projecting from opposite ends of the roller 59 are stub shafts 61 and 63 which are journalled in and project beyond plates 11 and 12 respectively. Roller 58 is likewise provided with oppositely projecting axial stub shafts 61 which are journalled in plates 11 and 12, shaft 64 journalled in plate 12 projecting beyond 12.

A pair of similar meshing gears 65 are affixed to shafts 63 and 64 adjacent the outer face of plate 12 whereby rollers 58 and 59 are positively driven in opposite directions. A sprocket wheel 66 is affixed to the free end of roller shaft 61 (FIG. 3). Extending between and journalled to plates 11 and 12 at the level of shaft 61 is a shaft 67 which projects beyond plate 11 and has a sprocket 68 affixed to its free end. A sprocket chain 69 connects sprocket wheels 68 and 66. A pair of sprocket wheels 55 and 70 are affixed to shafts 67 and 29 respectively and are connected by a sprocket chain 71. It will be appreciated that, with the rotation of paddle wheels 17 to 22 in the directions above set forth feed rolls 58 and 59, as viewed in FIGURE 4, rotate counter-clockwise and clockwise respectively so that tobacco disposed in the bite between these rollers is rejected and borne upwardly.

An arrangement for adjusting the tobacco feed of rollers 58 and 59 without varying the speed thereof includes a pair of downwardly converging guide plates 72, of similar construction, disposed on opposite sides of feed rollers 58 and 59 and extending between plates 11 and 12. Each guide plate 72 includes a main inclined rectangular panel 73 extending upwardly and outwardly from a point spaced from the outer periphery of a corresponding feed roller 58, 59 below the axis thereof to a point at about the level of the tops of intermediate bars 13 and 14. Each panel 73 is provided at its lower edge with a depending skirt 74 terminating in an outwardly projecting flange 76, and is provided at its upper edge with an upwardly projecting panel 77 terminating in an outwardly directed flange 77a. A pair of longitudinally spaced triangular mounting blocks 78 are secured to the under face of each panel 73 adjacent their side edges and adjacent plates 11 and 12, and have longitudinally aligned bores formed therein. Pivot pins 79 engage aligned bores in the blocks 78 and rockably register with corresponding aligned bores formed in the respective plates 11, 12, pins 79 registering with bores in plate 11 and project beyond plate 11. Blocks 78 are adjustably affixed to the pins 79 by set screws 80 engaging tapped transverse bores in blocks 78 and bearing on pins 79.

Affixed to the free ends of pins 79 adjacent the outer face of plate 11 are a pair of similar worm gears 81. An inclined adjustment shaft 82 is rotatably supported on the outer face of plate 11 by a pair of axially spaced bearing blocks 83 mounted on the plate 11. A pair of coaxial worms 84 are affixed to opposite ends of shaft 82 and engage the respective upper and lower sections of opposite worm gears 81. Shaft 82 is provided at its end with a slotted head 86 to facilitate the angular adjustment of said shaft by means of a screw driver. Thus, by turning shaft 82 worm gears 81 are turned in opposite directions correspondingly to turn guide plates 72 and thereby adjust each of the tobacco feed passageways which is delineated by the lower border of a respective of the guide plates, 72 and the confronting adjacent surfaces of the respective feed roller 58 or 59 by the same amount. Guide plates 72 are preferably initially adjusted so that the aforesaid tobacco feed passageways are of the same width.

In order to assure uniform feed of tobacco along guide plates 72 and to prevent any bridging there is provided a vertically and longitudinally reciprocating rake mechanism which is supported by intermediate bars 13 and 14. The rake mechanism includes pairs of differently transversely spaced aligned inner and outer bearing blocks 87 mounted on the outer faces of bars 13 and 14 respectively, relatively proximate and remote from the vertical medial axes of said bars and rotatably supporting shafts 85 and 88 which are disposed forwardly and rearwardly of bars 13 and 14, respectively and extend from the respective outer block 87 through the inner block 87 to a point short of the medial vertical axis of the corresponding bars 13, 14, shaft 85 extending beyond the respective outer block 87. A wheel 89 is affixed to the inner end of each of the shafts 85 and 88 and is provided with a crank pin 90 equally radially offset relative to the respective shafts 85, 88.

A longitudinal cross bar 91 extends between cross bars 13 and 14 and projects through vertical slots 92 formed therein so as to be vertically and longitudinally movable, the ends of bar 91 being provided with transverse bores which engage crank pins 90 which are similarly positioned so that similar rotation of wheels 89 effects the vertical and longitudinal reciprocation of said corss-bar 91 while maintaining its level position. Cross-bar 91 is medially located between guide plates 72 approximately at a level between the tops and bottoms thereof and carries a plurality of regularly longitudinally spaced teeth 94 formed of wire or the like. Each of teeth 94 includes a vertical upper portion or finger 96 passing through and secured in a corresponding vertical bore formed in cross-bar 91 and projecting to a point shortly above the upper edges of guide plates 72 and an integrally formed downwardly outwardly inclined lower finger 97 extending from a point shortly below cross-bar 91 to about the upper level of the feed rollers 58, 59 and terminating in a depending vertical leg 98 directed into a tobacco feed passage delineated by the confronting faces of a feed roller 58, 59 and the lower border of a corresponding guide panel 73. Fingers or portions 97 of successive teeth 94 are alternately oppositely directed so that the spacings between successive fingers 97 and legs 98 on opposite sides of the plane of fingers 96 are equal and twice that between the vertical fingers 96.

Supported on opposite ends of cross-bar 91 is a rectangular plate 99 provided with a rectangular opening engaging the cross-bar 91, plates 99 abutting the inner faces of bars 13 and 14 and plates 11 and 12. Helical compression spring 100 is entrapped between each plate 99 and the adjacent rake tooth 94 resiliently to load cross bar 91.

A first outwardly directed bevel gear 101 is affixed to the outer end of the shaft 85 contiguous to the outer face of adjacent outer block 87 and a second inwardly directed bevel gear 102 is affixed to the outer section of shaft 88 contiguous to the inner face of adjacent block 87. A transverse shaft 103 at the level of shafts 85 and 88 extends between and beyond and is journalled to opposite bars 13 and 14 and has affixed to its ends, contiguous to the outer faces of bars 13 and 14, bevel gears 105 and 104 which engage the bevel gears 101 and 102 respectively. A sprocket wheel 106 is affixed to shaft 103 and is coupled by a sprocket chain 107 to a sprocket wheel 108 affixed to shaft 67. Thus, upon rotation of main shaft 29 shafts 85 and 88 are rotated in a common direction thereby to oscillate the rake member by way of crank pins 90.

Supported by and between the upper mounting plates 16 are a pair of transversely spaced longitudinally extending hopper defining plates 109. Each plate 109 includes an outer upper vertical panel 110 terminating at its top in a longitudinally extending downwardly facing channel section 111 which engages a corresponding cross-bar 112 extending between plates 16. Projecting downwardly from the bottom edges of panels 110 are converging bottom panels 113 which terminate in flange reinforced depending lips 114 which are positioned slightly inside guide plate upper panels 77. Apertured ears 115 project outwardly from the opposite side lower edges of panels 113 and are contiguous and secured to the inner faces of plates 16. A suitably driven tobacco feed conveyor belt 116 is disposed above and discharges into the hopper defined by plates 109 and the advance thereof is controlled in any known manner in response to the level of tobacco between hopper plates 109 to regulate the feed of tobacco thereto.

A U-shaped longitudinal discharge trough 117 extends between mounting plates 11 and 12 in registry with the bottom opening 53 and forwardly of the leading plate 12 to a cigar or cigarette producing machine. Trough 117 includes a flat bottom base 118 and vertical side walls 119 to provide a longitudinal top opening 120 extending along its full length and disposed directly below and of slightly greater width than the space between the bottom edges of plates 52 and 56. An endless conveyor belt 121 has an upper run resting on and extending for the full length of the upper face of trough base 118 and is of substantially the same width thereof. Belt 121 is driven in any suitable manner, to advance along its upper run from trailing plate 11 toward and forwardly of the leading plate 12.

Feed regulator 130, as seen in FIGURES 6 to 11 of the drawings, is associated with the leading sections of trough 117 and the upper run of belt 121, and includes a bottom support plate 131 disposed below trough 117 forward of plate 12, the leading end of trough 117 being supported by a pair of uprights 132 mounted on plate 131 and secured to trough walls 119. Laterally forwardly offset from trough 117, between plate 12 and uprights 132, are a pair of transversely spaced longitudinally extending front and rear vertical support blocks 133 and 134 both mounted on the plate 131. A longitudinally extending horizontal base plate 136 extends between and is secured to the tops of blocks 133 and 134 and is located slightly below the level of trough base 118 and forwardly offset therefrom.

A longitudinally extending vertical mounting block 137 extends medially along the top face of the base plate 136 and is suitably secured thereto by end screws. A pair of longitudinally spaced leading and trailing vertical guide slots 138 are formed in block 137 symmetrical to the vertical medial axis thereof and extend from the bottom of the block 137 to points below the top of block 137. A pair of similarly constructed trailing and leading regulator wheel and guide member support plates 139 and 140 respectively are vertically and angularly adjustably supported by block 137.

Vertically slideably engaged by each slot 138 and restricted to vertical movement therein is a rectangular block 141 provided with oppositely forwardly and rearwardly directed coaxial pivot pins 142. Each block 141 has a vertical tapped bore formed therein coaxial with a bore formed in the upper part of block 137 and a lead screw 143 engages the tapped bore in block 141 and is provided with a shank which rotatably engages the corresponding bore in the block 137. Lead screw 143 is provided with a slotted upper head 144 bearing on the top face of block 137 to prevent downward movement of lead screw 143 and the lower end of the lead screw 143 is provided with a cylindrical shank 146 registering with a bore in base plate 136 and engaged at its lower part by a locking member 147 engaging the base plate 136 to prevent upward movement of the feed screw 143. Thus, the vertical position of corresponding pivot pins 142 may be adjusted by turning the respective lead screws 143.

The support plates 139 and 140 project longitudinally oppositely toward the machine feed and discharge ends respectively from mounting block 137 and each is provided at its inner section proximate block 137 with an integrally formed horizontal yoke member defined by a pair of transversely spaced short and long arms 148 and 149 respectively, the short arm 148 of trailing plate 139 and the long arm 149 of leading plate 140 being forwardly disposed. Each pair of yoke arms 148 and 149 extend along opposite faces of mounting block 137 and has transversely axially aligned bores formed therein which engage a corresponding pair of pivot pins 142 to permit the angular movement of plates 139 and 140 about pivot pins 142. A first adjusting screw 150 engages a tapped vertical bore at the inner end of each of the yoke short arms 148 and is provided with a spherical tip 150a at its lower end bearing on the top face of the plate 136. A second adjusting screw 151 engages a tapped vertical bore adjacent the outer end of each of the yoke long arms 149 and is likewise provided with a spherical tip 151a bearing on the top face of the plate 136, screws 150 and 151 being longitudinally symmetrically located on opposite sides of the corresponding blocks 141. Thus, the heights and vertical angles of arms 148 and 149 may be adjusted by means of the screws 143, 150 and 151.

Mounted atop support plate 139 proximate and machine feed end is a first or trailing set of three successive longitudinally spaced transverse bearing blocks 152, 153 and 154 respectively and mounted atop the support plate 140 proximate and machine discharge end is a second or leading set of three successive transverse bearing blocks 156, 157 and 158. Bearing blocks 152 to 158 inclusive are of similar dimensions, block 152 being secured to the top trailing face of plate 139 and the blocks 153 to 158 registering with successively deeper transversely extending channels in plates 139 and 140 whereby the bearing blocks 152 to 158 are regularly successively lower approaching the leading end of the machine when plates 139 and 140 are at the same horizontal level. The longitudinal spacing between bearing blocks 153 and 154 and between 157 and 158 are equal and greater than the spacing between the bearing blocks 152 and 153, and 156 and 157 which are likewise equal.

A separate transverse shaft 159 is individually rotatably supported by each of the bearing blocks 152 to 158 at successively lower levels, projecting from opposite sides of the bearing blocks and extending across trough 117 a short distance above the top thereof. Secured to the front end of each shaft 159 (as viewed in FIG. 7) is a similar pulley drum 160. A rough surfaced cylindrical regulator wheel or roller 161 is affixed to the rear end of each shaft 159 and enters trough 117 to an adjustable distance above conveyor belt 121, the rollers 161 being successively lower toward the leading end of the machine. The end faces of rollers 161 are spaced slightly inwardly from the inner faces of the trough side walls 119. The peripheral faces of rollers 161 are roughened in any suitable manner advantageously corresponding to that of a grit between 10 and 80, and preferably to that of a grit between 20 and 40. In the illustrated arrangement the regulator rollers 161 includes a selectively radially expandable and contractable cylindrical rubber core 162 which carries a conventional abrasive sandpaper sleeve 163 having a cloth or paper backing and coated with a sand or like grit of the above grade, for example, a 30-grit sanding sleeve. Thus, the abrasive surface of each roller may easily be replaced or changed.

An upright bracket 164 is mounted on each of plates 139 and 140 adjacent their rear edges and between blocks 153, 154 and 157, 158 respectively, and includes a rearwardly directed arm 165 disposed above the level of rollers 161. A longitudinally extending guide member 166 is integral with the underface of each of the bracket arms 165 and projects longitudinally forwardly and rearwardly therefrom as shown in FIG. 11, that is, toward the discharge and feed ends respectively. Each guide member 166 includes a depending leading section 167 having upwardly diverging cylindrical concave leading and trailing surfaces 168 and 169 respectively which meet at a sharp downwardly directed bottom apex 170 extending across and closely adjacent to the trailing peripheral surface of the corresponding leading roller 161 of the trailing and leading sets of three thereof.

The leading surfaces 168 diverge from the peripheries of the corresponding leading rollers 161 upwardly from the apices 170. The trailing surfaces 169 extend from the apices 170 which are disposed forwardly of the next successive trailing rollers 161 upwardly substantially coaxially with the axes or said trailing rollers 161 to horizontally longitudinally extending surfaces 171 which are disposed above the levels of the tops of the corresponding trailing pairs of rollers 161.

A transverse shaft 172 is medially journalled in and projects beyond the lower parts of plates 133 and 134 and is suitably restricted against axial movement. Affixed to the rear end of shaft 172 is a pulley 173 which is coupled by a belt 174 and another pulley to the shafe of an adjustable speed electric motor of any known or conventional construction. A drum 176 is affixed to the front end of shaft 172. A first belt 177 couples drum 176 to pulleys 160 connected to the trailing set of regulator rollers 161, extending around the lower rear periphery of drum 176, over trailing pulley 160, under the intermediate pulley 160 and over the leading pulley 160 of the trailing set thereof whereby, with the normal clockwise rotation of drum 176, as viewed in FIGURE 7, the leading and trailing rollers 161 rotate clockwise and the intermediate roller 161 rotates counterclockwise. Similarly, a second belt 178 couples drum 176 to pulleys 160 connected to the leading set of regulator rollers 161, extending around the lower front periphery of the drum 176, over trailing pulley 160, under intermediate pulley 160 and over leading pulley 160 of the leading set thereof whereby the leading and trailing rollers 161 of the leading set thereof rotate clockwise and the intermediate roller 161 rotates counterclockwise.

Drive belts 177 and 178 are maintained taut by a pair of first and second belt tensioning devices. The first tensioning device comprises a transverse shaft 179 suitably journalled to the lower trailing corner of the plate 133 and having a horizontal longitudinally rearwardly extending arm 180 affixed to its end and an upwardly longitudinally rearwardly inclined arm 181 suitably affixed to its end. An idler wheel 182 is mounted on the free end of arm 181 by means of axle 183 and bears upon the underface of belt 177 along its run between drum 176 and the trailing pulley 160. A helical tension spring 184 connects the free end of the arm 180 to a pin 186 projecting from the trailing faces of the plate 136 to resiliently urge the idler wheel 182 into engagement with the belt 177 and tension the latter. The second tensioning device comprises a transverse shaft 187 journalled to the upper leading corner of plate 133 and having a horizontal longitudinally forwardly directed arm 188 affixed to its inner end and an upwardly longitudinally forwardly inclined arm 189 affixed to its outer end. An idler wheel 190 is mounted on the free end of the arm 189 by means of an axle 191 and bears upon the top face of belt 178 along its run between the drum 176 and the trailing pulley 160 of the leading set thereof. A helical tension spring 192 connects the free end of arm 188 to a stationary ear 193 to urge idler wheel 190 resiliently into engagement with belt 178 to tension the latter.

Considering now the operation of the apparatus described above, tobacco T which is of a shredded nature is delivered by the conveyor 116 to the feed hopper delineated by plates 109, the level therein being maintained at a predetermined level, as aforesaid. Tobacco T falls into the passageways along the outer faces of the rollers 58 and 59 remote from the bite thereof and is kept free flowing in the hopper and passageways by the vertically and horizontally reciprocating rake teeth 94. The tobacco is advanced through the aforementioned passageways by rollers 58 and 59 and the rate of feed therethrough is adjusted to that of the tobacco consumption by the cigar making machine fed by the present apparatus by adjusting the angle of the plates 72 by means of the adjustment shaft 82, as above set forth to adjust the distance between skirts 79 and rollers 58 and 59.

The shredded tobacco advancing through the feed passageways falls into compartments delineated by successive paddles 27 of wheels 18 and 19 and conveyed outwardly thereby toward wheels 17 and 20 respectively being tumbled and manipulated by the interdigitating fins or blades or paddles of the respective wheels. The tobacco-carrying compartments thence move downwardly and the tobacco carried therein slides downwardly by gravity and under the influence of the interdigitating paddle onto the immediately underlying paddles 27 of paddle wheels 17 and 20 from which the tobacco T falls into the outer compartments delineated by successive paddles of the paddle wheels 21 and 22. The paddle wheels 21 and 22 rotate to convey the tobacco T toward the space between them tumbling the tobacco again, as aforesaid, and discharging it medially downwardly into the trough 117 on to the belt 121 which transports it longitudinally forwardly. The tumbling, transfer and handling of the shredded tobacco T by the paddle wheels effects the physical positioning and orientation thereof so that it is in an optimum condition as it is deposited onto belt 121. Moreover, since the paddles 27 move upwardly as well as downwardly, any excessive quantity of tobacco accumulation in any of the areas does not adversely affect the operation of the apparatus since the excess tobacco is merely recirculated by the paddle wheels which convey the excess tobacco upwardly and thence downwardly. It should be noted that under normal operating conditions the lower pair of paddle wheels 21 and 22, handles twice as much tobacco T as either pair of paddle wheels 17, 18 and 19, 20 and any excess tobacco which cannot be advanced by the lower pair of paddle wheels is converged upwardly by the mating intermediate upper pair of paddle wheels 18 and 19.

The mat M of tobacco T deposited in trough 117 is generally of uneven height and since the cigar making machine requires a uniform tobacco filler stream, belt 121 conveys the tobacco mat M through a height regulating and control zone where it is successively exposed to the trailing and leading sets of regulator rollers 161; the trailing set effect a rough leveling of mat M and the the leading set effect a fine or finish leveling thereof. The rollers 161 are adjusted so that they are at successively lower levels, the bottom of the leading roller 161 being at the level of the desired height of the finished mat M. The trailing or first roller 161, rotating opposite to the advance of the tobacco mat, rejects the tobacco above the level of the bottom thereof which accumulates in a bunch behind the first roller 161 to provide a tobacco reservoir. When mat M fed thereto is relatively low, very little or no tobacco T trailing the first roller above the aforesaid level is carried by and over the first roller 161 to the front thereof. The next successive or second roller 161 rotates in the direction of advance of the mat M and advances any tobacco fed to its underface and effects a compression of the mat M. The mat M then advances to the next successive or third roller 161 of the trailing set which rotates in a direction opposite to that of the mat advance rejecting any tobacco above the level of its underface and flinging it between the guide surface 169 and the second roller 161, where it is seized and conveyed by the second roller 161 into the space between the first and second rollers and recirculated forwardly by the second roller. Mat M then advances from the trailing set of rollers to the leading set of rollers 161 where it is again treated as aforesaid and delivered by the conveyor 121 as a uniform mat M of the desired optimum density and orientation to a cigar or cigarette producing machine.

In accordance with a specific example of the operation of the treating and advancing of cigar filler tobacco such a tobacco having 6 to 3 cuts per inch, the regulator rollers 161 were of 1⅝" diameter, carried 30 grit abrasive sleeves 163, and were rotated at a peripheral speed of about 15,000 inches per minute. The spacing between the trailing rollers 161 of each set was ¹⁄₁₆" and between the leading rollers of each set ½". The height of the roller of the leading set or sixth roller above the belt 121 was about ⅝", the next trailing or fifth roller 161, was ¹⁄₃₂" higher than the sixth roller, and the next trailing or fourth roller was ¹⁄₃₂" higher than the fifth roller. The third roller was at the level of the fourth roller, the second roller was ¹⁄₁₆" higher than the third roller and the first roller was ¹⁄₁₆" higher than the second roller. The belt 121 was advanced at about 650" per minute.

It will be appreciated that the various parameters such as the levels of rollers 161, the speeds thereof, the speeds of belt 121 and the paddle wheels, and the positions of plates 72, may be adjusted to match the desired operation and the tobacco being treated to obtain optimum results.

The speed of the belt 121 may range up to 3000" per minute and the peripheral speeds of the rollers 161 between 9,000" and 24,000" per minute. The spacing between the confronting peripheral surfaces of adjacent rollers in each set thereof ranges between ¹⁄₁₆" and ¾" and each roller 161 is up to ¼" higher than the next successive leading roller 161. The leading roller 161 ranges between ¼" and ¾" above belt 121.

It is to be noted that while the discharge rate of the feed section 10 may be manually adjusted to match that of the regulator section 130 it may be adjusted automatically in any suitable manner, such as by sensing the height of the mat M behind the trailing roller 161 and regulating the speed of the motor driving shaft 29 in response thereto to vary the motor speed inversely to the height of the tobacco accumulation.

In FIGURES 12, 13 and 14 there are illustrated different modes of operation of the leading and trailing sets of the regulating section, which differ from that described above in the direction of rotation of the trailing pair of rollers 161 of each set thereof, such changes in rotation being effected by correspondingly modifying the runs of the belts 177 and 178. It should be noted, however, that in each case the leading roller 161 of each set rotates in a direction opposite to the advance of the tobacco mat M or in a reject manner.

In the operational mode illustrated in FIGURE 12 all rollers 161 are rotated in a reject manner, that is, opposite the direction of advance of mat M. This arrangement has been found particularly suitable in the handling of shredded tobacco fillers of the type having 24 and 16 cut per inch. The intermediate roller is about 1/8" higher than the leading roller and 3/16" lower than the trailing roller. In the operational mode shown in FIGURE 13 the trailing pair of rollers 161 are rotated in the direction of advance of the mat M or a feed direction. In the operational mode shown in FIGURE 14 the trailing roller 161 is rotated in a feed direction and the intermediate roller is rotated in a reject direction, this mode possessing advantages in the handling of tobacco filler having 8 and 6 cuts per inch.

While there have been described and illustrated preferred embodiments of the present invention it is apparent that numerous alterations, omissions and additions may be made without departing from the spirit thereof.

I claim:

1. A feed regulating device comprising an endless belt having a horizontal longitudinal run, means for advancing said belt along said run from a feed section to a discharge section, means for depositing a particulate material on said belt feed section, a roller disposed above said belt run forward of said feed section and rotatable about a transverse axis relative said run said roller having a peripheral surface with a roughness corresponding to sandpaper having a grit between 10 and 80, and means for rotating said roller with its underface moving in a direction opposite to that of said belt along said run, said roller being positioned so that said undersurface engages said material on said belt so that the quantity of material thereon at said discharge section is rendered uniform.

2. A feed regulating device comprising an endless belt having a longitudinal run, means for advancing said belt along said run from a feed section to a discharge section, means for depositing a particulate material on said belt feed section, a first roller member with a rough peripheral surface disposed above said belt upper run forward of said feed section and rotatable about a transverse axis relative to said run, a second roller with a rough peripheral surface disposed above said belt upper run between said first roller and said feed section and rotatable about a transverse axis relative to said run, means for rotating said first and second rollers with the underface of said first roller moving in a direction opposite to that of said belt along said upper run, a guide member disposed above said rollers and including an underface extending from substantially the trailing periphery of said first roller upwardly and rearwardly, and spaced forwardly of and above the peripheral surface of said second roller to delineate a passageway therewith.

3. The device of claim 2, wherein the underface of said second roller is at a higher level than that of said first roller.

4. The device of claim 2, wherein said second roller is rotated with its underface moving in the direction of movement of said belt along said upper run and at a peripheral speed greater than that of said belt.

5. The device of claim 2, wherein said second roller is rotated with its underface moving in a direction opposite to that of the said first roller.

6. The device of claim 2, including a third roller with a rough peripheral surface disposed above said belt upper run between said second roller and said feed section and rotatable about a transverse axis, and means for rotating said third roller.

7. The device of claim 6, wherein the underface of said third roller is above the level of that of said second roller.

8. The device of claim 6, wherein said third roller is rotated with its underface moving in a direction opposite to that of said belt along said upper run.

9. The device of claim 2, wherein the peripheral surfaces of said rollers have roughness between 10 and 80 grit.

10. The device of claim 2, wherein the underface of said first roller is disposed above said belt between 1/4" and 1 1/4" and the underface of said second roller is between the level of the underface of said first roller and 1/4" above said level.

11. The device of claim 2, wherein the spacing between the adjacent peripheral surfaces of said rollers is between 1/8" and 3/4".

12. The device of claim 2, wherein the peripheral speeds of rollers is between 9,000 and 24,000 inches per minute.

13. The device of claim 2, including means for adjusting the heights of said rollers relative to said belt.

14. The feed regulating device of claim 1 including a second roller parallel to and positioned adjacent to and rotated in an opposite sense to said first mentioned roller and having a peripheral surface with a roughness corresponding to a sandpaper having a grit between 10 and 80.

References Cited

UNITED STATES PATENTS

| 530,718 | 12/1894 | Pollard. | |
| 531,259 | 12/1894 | Bucklin. | |
| 726,607 | 4/1903 | Allison | 131—109 |
| 750,254 | 1/1904 | Calbera | 131—84 X |
| 1,133,844 | 3/1915 | Du Brul | 131—64 |
| 1,399,209 | 12/1924 | Grahl | 131—84 |
| 1,709,299 | 4/1929 | Bargeboer | 131—84 |
| 1,755,081 | 4/1930 | Schuenemann. | |
| 2,676,694 | 4/1954 | Wyss et al. | 131—109 X |
| 3,067,551 | 12/1962 | Maginnis | 51—289 X |

FOREIGN PATENTS

| 128,644 | 2/1902 | Germany. |
| 953,076 | 3/1964 | Great Britain. |

JOSEPH S. REICH, Primary Examiner

U.S. Cl. X.R.

131—109